United States Patent [19]
Laufer

[11] Patent Number: 6,150,956
[45] Date of Patent: Nov. 21, 2000

[54] PROXIMITY WARNING SYSTEM FOR VEHICLES

[75] Inventor: Zohar Laufer, Karmiel, Israel

[73] Assignee: Zohar Lightomatic Ltd., Karmiel, Israel

[21] Appl. No.: 09/071,302

[22] Filed: May 1, 1998

[51] Int. Cl.[7] .................................................. G08G 1/16
[52] U.S. Cl. .............................. 340/903; 340/435
[58] Field of Search .................................. 340/903, 901, 340/904, 942, 938, 435; 367/99, 909; 307/10.1; 701/301; 250/222.1; 356/3, 14; 382/106; 348/148, 149

[56] References Cited

U.S. PATENT DOCUMENTS

| | | | |
|---|---|---|---|
| 3,732,536 | 5/1973 | Larka et al. | 340/903 |
| 4,447,800 | 5/1984 | Kasuya et al. | 340/904 |
| 4,455,487 | 6/1984 | Wendt | 340/578 |
| 4,825,211 | 4/1989 | Park | 340/901 |
| 5,057,833 | 10/1991 | Carlson | 340/961 |
| 5,122,796 | 6/1992 | Beggs et al. | 340/904 |
| 5,225,827 | 7/1993 | Persson | 340/904 |
| 5,249,157 | 9/1993 | Taylor | 340/903 |
| 5,311,012 | 5/1994 | Juds et al. | 250/222.1 |
| 5,463,384 | 10/1995 | Juds | 340/903 |
| 5,612,686 | 3/1997 | Takano et al. | 340/903 |
| 5,929,784 | 7/1999 | Kawaziri et al. | 340/904 |

*Primary Examiner*—Brent A. Swarthout
*Attorney, Agent, or Firm*—Mark M. Friedman

[57] ABSTRACT

A system for warning of the proximity of an obstacle within a zone of interest adjacent to a vehicle includes at least one primary sensor configured to produce a primary output indicative of a quantity of electromagnetic radiation incident on the primary sensor from the zone of interest. Also provided is a device for generating a compensation output indicating a quantity of background electromagnetic radiation incident on the primary sensor. A number of transmitters transmit an electromagnetic signal towards the zone of interest. A compensation module responds to the compensation output to vary a transmission power of the electromagnetic signal. A processing module associated with at least the primary sensor generates a warning signal in response to the primary output.

12 Claims, 9 Drawing Sheets

LD Operating Life vs. Optical Output Power (Example)

PROXIMITY WARNING SYSTEM FOR VEHICLES

FIELD AND BACKGROUND OF THE INVENTION

The present invention relates to vehicle safety systems and, in particular, it concerns a proximity warning system for warning of the proximity of an obstacle adjacent to a vehicle.

A large number of systems have been suggested for detecting and warning a driver of the presence of stationary or moving obstacles adjacent to a vehicle, typically, a motor vehicle.

Of most relevance to the present invention are a number of examples of active optical systems in which a signal, typically infrared, is transmitted towards the zone of interest and the reflected signals are analyzed. Examples of such systems are described in U.S. Pat. No. 4,825,211 to Park, U.S. Pat. No. 5,122,796 to Beggs et al. and U.S. Pat. No. 5,463,384 to Juds.

Practical implementations of the aforementioned systems a plagued by a number of problems as will now be described with reference to FIGS. 1–3. FIG. 1 illustrates the output current of a typical photodiode as a function of incident radiant energy, while FIG. 2 shows the corresponding variation in sensitivity. In order for the photodiode to remain functional even when exposed to direct sunlight, extensive filtering must be used to avoid saturation. Even after such filtering, the sensitivity of the photodiode under high levels of background radiation is severely reduced. As a result, high energy levels of transmitted signal are required to allow effective measurement.

FIG. 3, on the other hand, shows the relationship between optical output power and the lifetime for a typical LED suitable for use in these systems. It may be seen that high power use drastically reduces the lifetime of the LED compared with lower power usage. Thus, the high power required for the system to be functional under strong illumination conditions typically leads to rapid failure and unreliability of the transmitter elements.

A further shortcoming of the existing systems is their inability to provide complete reliable coverage of a well-defined zone adjacent to the vehicle. Thus, by way of example, Beggs et al. monitors various circular segments whereas Juds speckles a rectangular region with various isolated beams. For applications such as reversing, a driver needs to be made aware of any obstacle present within a given distance from the rear of the vehicle, independent of the transverse position of the obstacle and without risk of it falling "between" the detection beams. None of the aforementioned systems can satisfy such requirements.

Finally, there remains a need for a manner of providing unambiguous information to the driver of the vehicle as to the proximity of an obstacle. Certain systems have provided a variable pitch warning in which the pitch of an audible signal varies as a function of the distance to an obstacle. However, such a warning is open to subjective interpretation.

There is therefore a need for a proximity warning system for vehicles which can operate effectively in any illumination conditions while maximizing the lifetime of its components. It would also be advantageous to provide a proximity warning system for vehicles which provides complete reliable coverage of a well-defined zone adjacent to the vehicle, and gives an unambiguous indication to the driver of the proximity of an obstacle.

SUMMARY OF THE INVENTION

The present invention is a proximity warning system for vehicles.

According to the teachings of the present invention there is provided, a proximity warning system for warning of the proximity of an obstacle within at least one zone of interest adjacent to a vehicle, the system comprising: (a) at least one primary sensor deployed to receive radiation from at least part of the zone of interest, the primary sensor being configured to produce a primary output indicative of a quantity of electromagnetic radiation incident on the primary sensor; (b) means for generating a compensation output indicative of a quantity of background electromagnetic radiation incident on the primary sensor; (c) at least one transmitter configured to transmit an electromagnetic signal towards at least part of the zone of interest; (d) a compensation module associated with means for generating a compensation signal and the transmitter, the compensation module being responsive to the compensation output to vary a transmission power of the electromagnetic signal; and (e) a processing module associated with at least the primary sensor, the processing module being responsive to the primary output to generate a warning signal.

According to a further feature of the present invention, the transmitted electromagnetic signal lies within the infrared portion of the electromagnetic spectrum.

According to a further feature of the present invention, the at least one primary sensor is sensitive to a first range of wavelengths, and wherein the means for generating a compensation output includes at least one secondary sensor configured to produce a compensation output indicative of a quantity of electromagnetic radiation within a second range of wavelengths incident on the secondary sensor, the transmitter being configured to transmit an electromagnetic signal at a wavelength falling within the first range but outside the second range.

According to a further feature of the present invention, the second range lies substantially within the visible portion of the electromagnetic spectrum.

According to a further feature of the present invention, there is also provided a radiation filter deployed in front of both the at least one primary sensor and the at least one secondary sensor, the radiation filter being configured to substantially block a major part of both the infrared portion and the visible portion of the electromagnetic spectrum.

According to a further feature of the present invention, each of the at least one secondary sensor is deployed adjacent to a corresponding one of the at least one primary sensor.

According to a further feature of the present invention, there is also provided a signal generator associated with the at least one transmitter and the compensation module, the signal generator being configured to generate an underlying pulsed power supply having a duty cycle of less than about 5%.

According to a further feature of the present invention, there is also provided a modulator module associated with the at least one transmitter and the compensation module, the modulator module being configured to modulate the transmission power of the electromagnetic signal cyclically between at least two relative power levels corresponding to at least two different-sized zones of interest, a highest one of the at least two relative power levels being generated for less than about 20% of each cycle.

There is also provided according to the teachings of the present invention, a proximity warning system for warning of the proximity of an obstacle within a zone of interest adjacent to a vehicle, the zone being delineated at least in part by a virtual straight line, the system comprising: (a) a plurality of transmitter elements responsive to an actuating power supply to transmit an electromagnetic signal towards the virtual straight line; and (b) at least one sensor responsive to a received reflected electromagnetic signal from the virtual straight line to generate a reception signal, wherein the configuration and the deployment of the transmitter elements and of the at least one sensor are such that, for a given level of actuating power supply, the reception signal resulting from reflection of the transmitted electromagnetic signal from the surface of an object remains substantially constant as the object is moved along a path corresponding to a part of the virtual line.

According to a further feature of the present invention, each of the transmitter elements has a transmission intensity which decreases as a function of angle from a maximum intensity direction, two of the transmitter elements being deployed with their maximum intensity directions angularly spaced such that a total transmitted intensity assumes a minimum value at an intermediate angular position, and wherein the sensor has a reception sensitivity which decreases as a function of angle from a maximum sensitivity direction, the sensor being aligned with its maximum sensitivity direction aligned substantially with the intermediate angular position of minimum total transmitted intensity.

According to a further feature of the present invention, each of the transmitter elements has a transmission intensity which decreases as a function of angle from a maximum intensity direction to a 50% intensity direction, two of the transmitter elements being deployed with their maximum intensity directions angularly spaced such their 50% intensity directions are substantially aligned.

According to a further feature of the present invention, there is also provided a transmission power modifier associated with each of the transmitter elements, each of the transmission power modifiers modifying the effect of the actuating power supply upon the corresponding one of the transmitter elements such that a combined intensity of the electromagnetic signal from all of the transmitter elements reaching the part of the virtual line is substantially constant along the line.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a proximity warning system for vehicles.

The principles and operation of systems according to the present invention may be better understood with reference to the drawings and the accompanying description.

Before addressing the features of the present invention in detail, it should be noted that the invention includes a first set of features, described with reference to FIGS. 4–8, relating to compensation for background radiation, and a second set of features, described with reference to FIGS. 9–11, relating to geometrical deployment of sensor elements. Each set of features may be used independently in separate systems. However, in a preferred embodiment, these features are combined to particular advantage to provide a highly effective and reliable proximity warning system.

Figure 1:
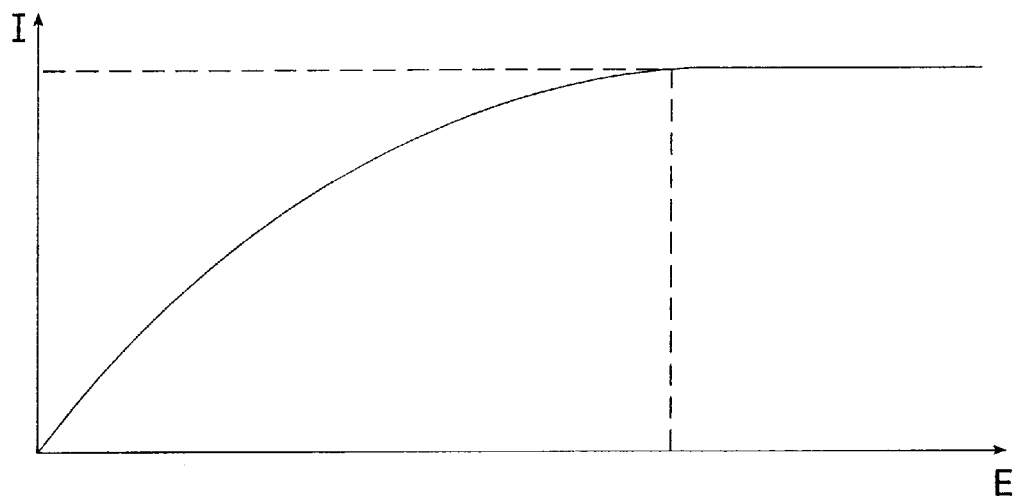
FIG. 1 is a representation of the output current of a typical photodiode as a function of incident radiant energy.
Figure 2:
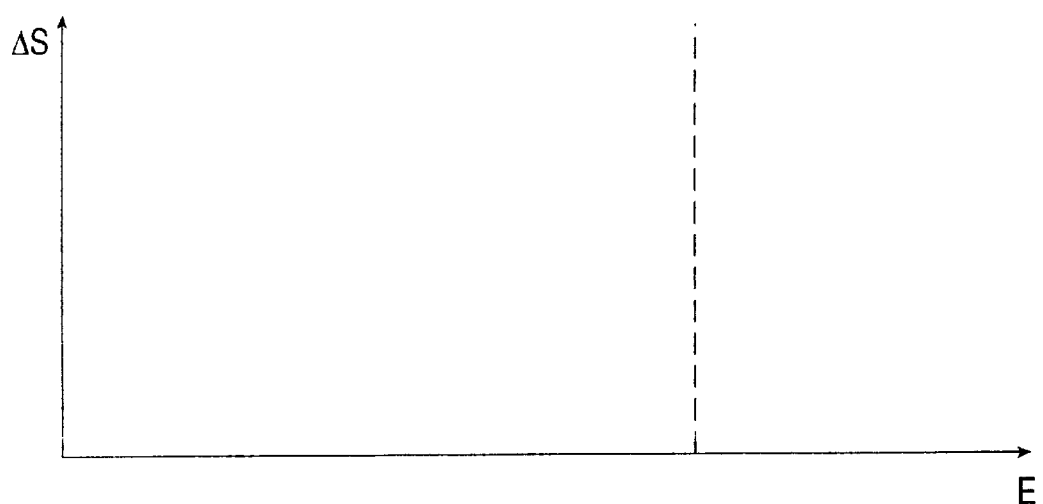
FIG. 2 is a representation of the variation in sensitivity of a typical photodiode as a function of incident radiant energy.
Figure 3:
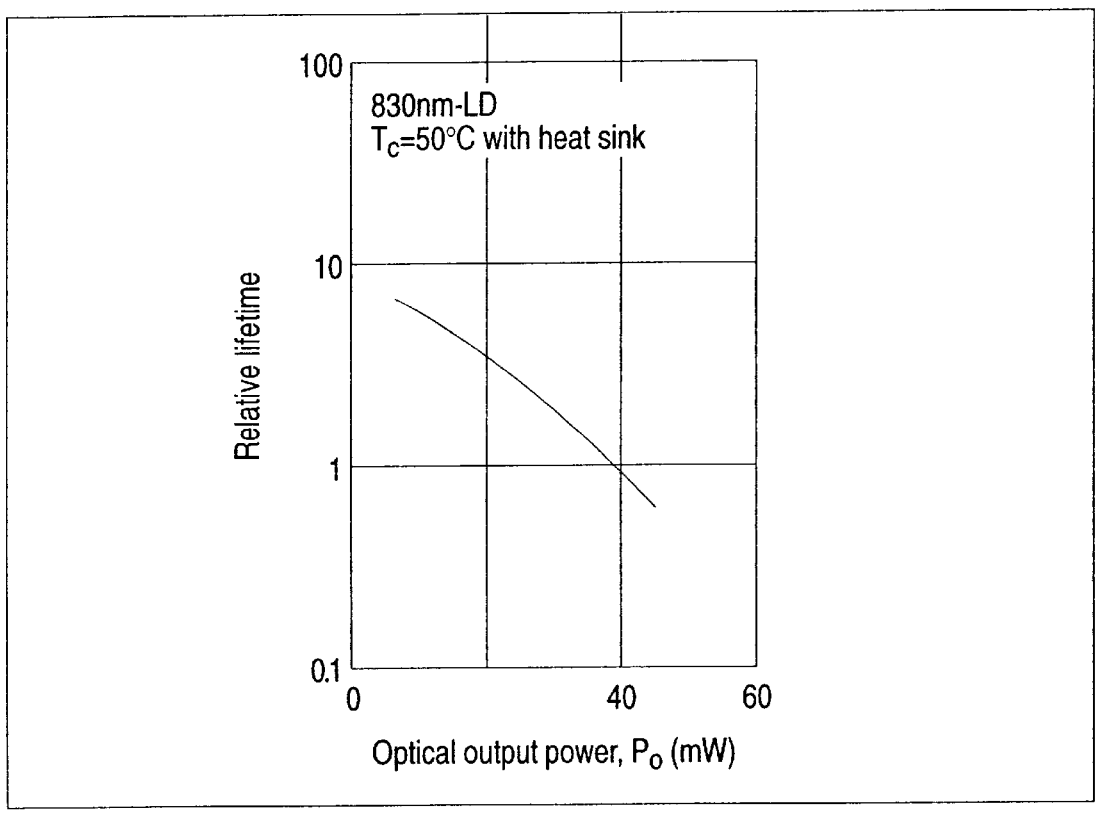
FIG. 3 is a representation of the relationship between optical output power and lifetime for a typical LED.
Figure 4:
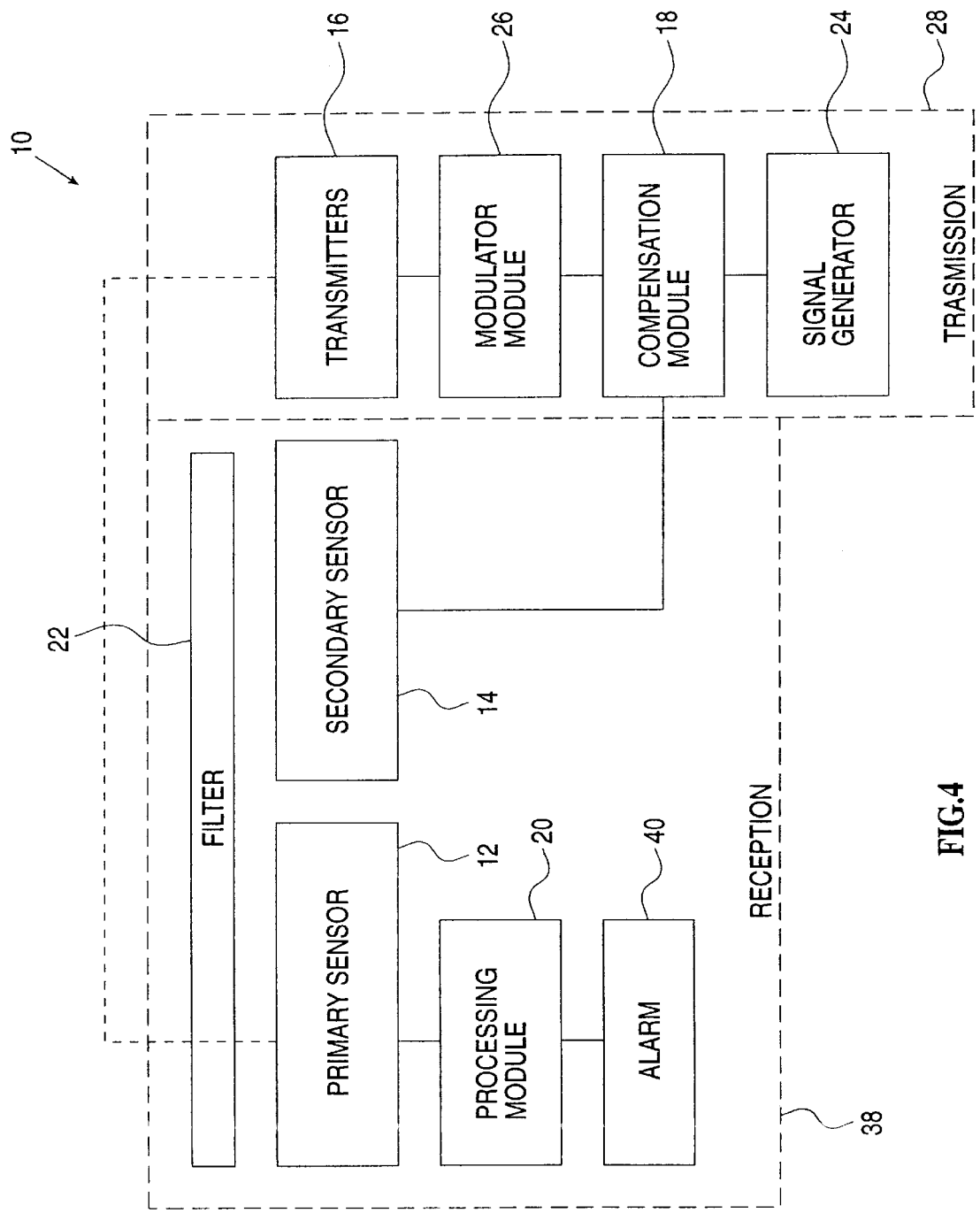
FIG. 4 is a block diagram of a proximity warning system, constructed and operative according to the teachings of the present invention.

Referring now to the drawings, FIG. 4 shows a proximity warning system, generally designated 10, constructed and operative according to the teachings of the present invention, for warning of the proximity of an obstacle within at least one zone of interest adjacent to a vehicle.

Generally speaking, system 10 includes at least one primary sensor 12 deployed to receive radiation from at least part of the zone of interest. Primary sensor 12 is configured to produce a primary output indicative of a quantity of electromagnetic radiation incident on primary sensor 12. System 10 also includes means for generating a compensation output indicative of a quantity of background electromagnetic radiation incident on primary sensor 12.

At least one transmitter 16 is configured to transmit an electromagnetic signal towards at least part of the zone of interest. A compensation module 18 is responsive to the compensation output to vary a transmission power of the electromagnetic signal transmitted by transmitter 16. A processing module 20 is responsive to the primary output of primary sensor 12 to generate a warning signal.

It will readily be appreciated that the present invention addresses the conflicting considerations of operation under intense illumination and lifetime of components. Specifically, by adjusting the transmission power of the electromagnetic signal in accordance with the measured quantity of background illumination, high-power transmission can be used exclusively when required because of the illumination conditions. At other times, when no direct sunlight is falling on the system, relatively low power is used, thereby maximizing the components' lifetime.

Turning now to the features of system 10 in more detail, according to a first preferred embodiment of the present invention, the means for generating a compensation output includes at least one secondary sensor 14 for measuring the background radiation. In this case, primary sensor 12 is configured to be sensitive to a first range of wavelengths, while secondary sensor 14 is configured to be sensitive to a second range of wavelengths. By configuring transmitter 16 to transmit an electromagnetic signal at a wavelength falling within the first range but outside the second range, the secondary sensor is rendered insensitive to the transmitted signal and measures only the background radiation.

In order to ensure that the measured background is reliably indicative of the background radiation level in the wavelength range measured by primary sensor 12, the first and second ranges are preferably relatively close parts of the spectrum. In one preferred implementation, the transmitted electromagnetic signal lies within the near infrared portion of the electromagnetic spectrum and the secondary sensor 14 measures visible light intensity. Particularly when used in combination with an optical filter (described below) which selects the red end of the visible spectrum, the measured intensity of the visible sunlight radiation has been found to provide an near-infrared sun on of the simultaneous near-infrared sunlight intensity.

Both primary sensor 12 and secondary sensor 14 may be of any commercially available type sensitive to the wavelength bands of interest. Typically, such sensors are made up of a photodiode with appropriate prefiltration and an associated electrical circuit to generate a current output as a function of the incident radiation intensity within the given range. However, any other type of sensor capable of producing a signal indicative of the radiation intensity may equally be employed.

Preferably, system 10 also includes a radiation filter 22 deployed in front of both primary sensor 12 and secondary sensor 14. Radiation filter 22 is configured to reduce the level of incident radiation sufficiently to avoid saturation of the primary sensor even under conditions of direct sunlight. To this end, filter 22 is typically configured to substantially block major sections of the electromagnetic spectrum. In the case that infrared transmission is used, filter 22 preferably substantially blocks a major part of the infrared portion of the spectrum not required for reception of the reflected signal. Similarly, a major part of the visible spectrum is preferably also substantially blocked. In this context, "substantial blocking" is used to refer to blocking of at least about 90%, and preferably at least about 95%, of the incident radiation intensity of the blocked wavelengths. Optionally, depending on the sensitivity of the sensors used, filter 22 may also be designed to produce an intermediate degree of attenuation, typically between about 40% and about 60% of the intensity, over the first and/or second wavelength ranges. Radiation filters with the required properties may readily be produced by generally known techniques including, but not limited to, admixtures of selectively absorptive dyes in an acrylic or polycarbonate base.

In order to provide a reliable measurement of the instantaneous background radiation falling on primary sensor 12, secondary sensor 14 is preferably deployed adjacent to, and typically as close as possible to, primary sensor 12. As will be described below, system 10 typically employs at least two primary sensors 12. In this case, a corresponding secondary sensor 14 is preferably deployed adjacent to each primary sensor 12, thereby providing an independent indication of the sunlight currently falling on each primary sensor.

Turning now to transmitter 16, this is typically a light emitting diode (LED) designed to emit a signal of suitable wavelength, preferably within the near infrared range of the spectrum, typically in the range from about 800 to about 1000 nm. Preferred embodiments of the invention employ a plurality of LEDs with diverging lenses to cover a specific zone of interest. Specific geometrical arrangements of both the transmitters and sensors will be discussed below in more detail.

The signal transmitted by transmitter 16 corresponds to a base signal produced by a signal generator 24, modified by compensation module 18 and preferably also by a modulator module 26. Signal generator 24 is preferably configured to generate an underlying pulsed power supply having a duty cycle of less than about 5%, and typically no more than about 2%. In other words, the pulsed power supply is made up of a cycle of pulses of duration such that the total time of the pulses corresponds to no more than about 5% (or about 2%) of the total cycle, the rest of the cycle being unpowered "dead time". By way of example, this could be implemented as a signal generator of base frequency about 38 kHz switched to produce about 100 pulses per second, each of duration about $2\times10^4$ seconds corresponding to about 8 peaks of the base frequency. It should be appreciated, however, that the particular choice of base frequency used is not important, and may vary by as much as a few orders of magnitude from the example given. The use of such a low duty cycle helps to avoid overheating of the LEDs.

It should be noted at this point that, for convenience of presentation, the subsequent processing of the underlying pulsed power supply to generate the transmitted signal will be described without extensive reference to the pulsed nature of the power supply. Thus, transmission of the pulsed power supply for 10% of a one second cycle (0.1 second) will be referred to simply as transmission during 10% of a one second cycle. Clearly, the total time over which the LEDs will actually be transmitting is the product of this percentage with the duty cycle percentage.

Modulator module 26 is preferably configured to modulate the transmission power of the electromagnetic signal cyclically between at least two, and typically three or more, relative power levels each corresponding to a different-sized zone of interest. The highest transmission power produces the highest amplitude reflected signal, leading to detection of an object at a larger distance. Preferably, the highest relative power level is generated for less than about 20%, and typically between about 5% and about 15%, of each cycle. The period of cycle used is preferably within an order of magnitude from one second. Typically, the cycle period lies between about 0.2 and about 2 seconds, and most preferably, between about 0.5 and about 1 seconds. The significance of this choice will become clearer from the description of a preferred implementation of the warning system below.

Figure 5:
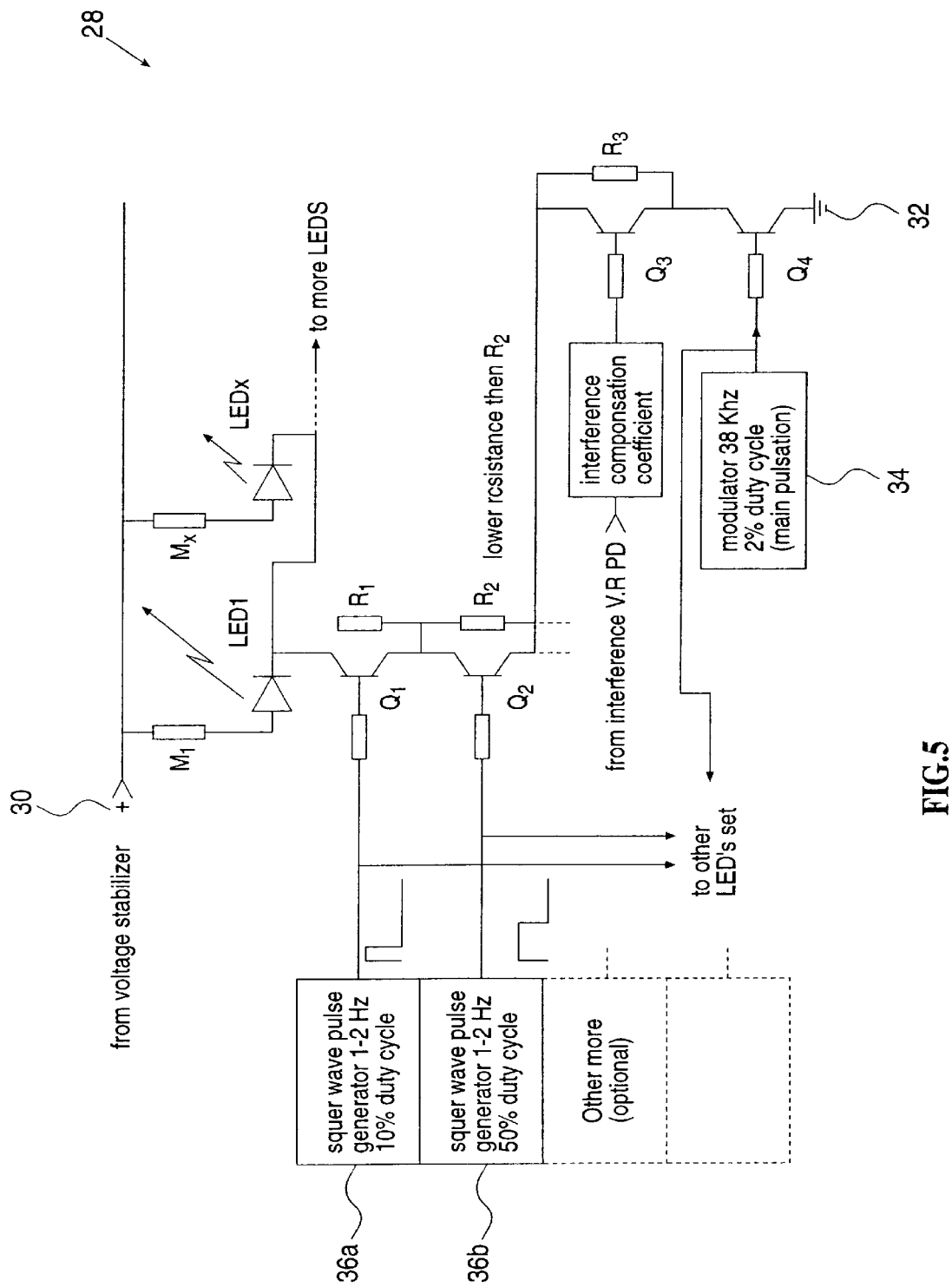
FIG. 5 is a schematic circuit diagram for a preferred implementation of a modulated transmission sub-system from the system of FIG. 4.

Turning now to FIG. 5, this illustrates a particularly simple and effective direct electronic implementation of the transmission sub-system 28 of system 10 which includes signal generator 24, compensation module 18, modulator module 26 and transmitter(s) 16. As mentioned before, transmitters 16 are implemented as a number of LEDs. Each LED 16 is connected through a dedicated transmission-power modifying resistor M1, Mx etc. between a stabilized voltage source 30 and indirectly to ground 32. Signal generator 24 is implemented as a modulator 34 with an output form as described above connected to operate a transistor switch Q4 which performs rapid switching of the ground connection. When Q4 is closed, the circuit through the LEDs is completed to generate a signal. The intensity of the signal, however, varies according to the state of a number of additional transistors Q1, Q2 and Q3, each of which is connected in parallel with a corresponding resistor R1, R2 and R3. Compensation module 18 is implemented using transistor Q3 and resistor R3. When the compensation signal indicates high levels of background radiation such as direct sunlight on the sensors, transistor Q3 effectively shorts across resistor R3 to generate the maximum available intensity transmission from LEDs 16. As the background radiation intensity decreases, the state of Q3 is gradually adjusted to reduce the LEDs intensity until, at low background intensity, resistor R3 reduces the LED intensity to near the lowest value at which the system is operative. In practice, it has been found that under most circumstances, the effect of the background radiation is only very significant under direct sunlight falling on filter 22. As a result, a basic implementation of compensation module may perform simple switching of Q3 between two extreme states. In a more precise implementation, compensation module 18 includes a conversion module, typically implemented as an analog or digital signal processing unit as either a function or look-up table, for converting the compensation signal to an appropriate control voltage for transistor Q3.

Modulator module 26, made up of pulse generators 36a and 36b, transistors Q1 and Q2 and resistors R1 and R2, provides a low-frequency cyclic modulation superimposed over the power supply variations produced by signal generator 24 and compensation module 18. In this case, two transistor stages are employed to generate three different intensity levels. However, it will be readily apparent that the number of stages may be either increased or decreased according to the number of levels required. Similarly, minor variations would enable more than two levels to be produced by use of a single transistor stage.

In the implementation shown, pulse generators 36a and 36b are synchronous square wave pulse generators operating at a common frequency between about 1 and about 2 Hz. They differ only in the duration of the pulses generated. Here, pulse generator 36a generates a pulse for 10% of the cycle whereas pulse generator 36b generates a pulse extending for 50% of the cycle.

Figure 6:
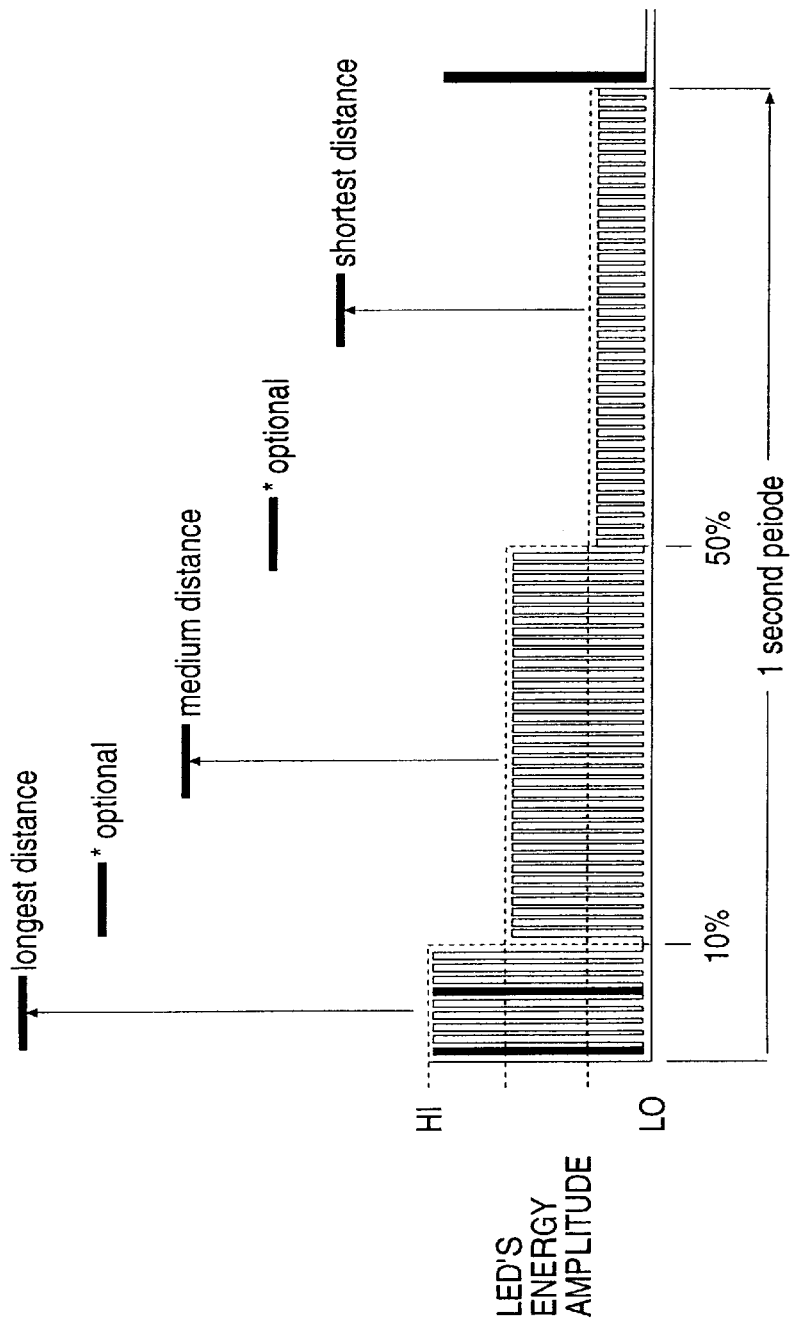
FIG. 6 is a schematic representation of a transmitted signal generated by the modulated transmission sub-system of FIG. 5.

The resulting transmitted signal is shown in FIG. 6. For the first 10% of the cycle, both pulse generators 36a and 36b produce a high output, causing transistors Q1 and Q2 to short across resistors R1 and R2 to generate the full intensity transmission currently allowed by compensation module 18. After the initial 10% pulse, pulse generator 36a goes low, blocking transistor Q1 so that resistor R1 lowers the transmitted intensity to an intermediate relative level. Then, for the second half of the cycle, pulse generator 36b also goes low, blocking transistor Q2 so that resistor R2 further lowers the transmitted intensity to a lowest relative level.

Referring back to FIG. 5, it should be noted that the system shown is readily expandable to any size of transmitter array. The LED array illustrated here may be extended as designated by LEDx, each LED being provided with its own modifying resistor Mx. Additionally, where different arrays of LEDs are to be controlled by independent compensation modules 18, the outputs of signal generator 24 and pulse generators 36a and 36b may be used simultaneously to control additional sets of transistors.

Figure 7:
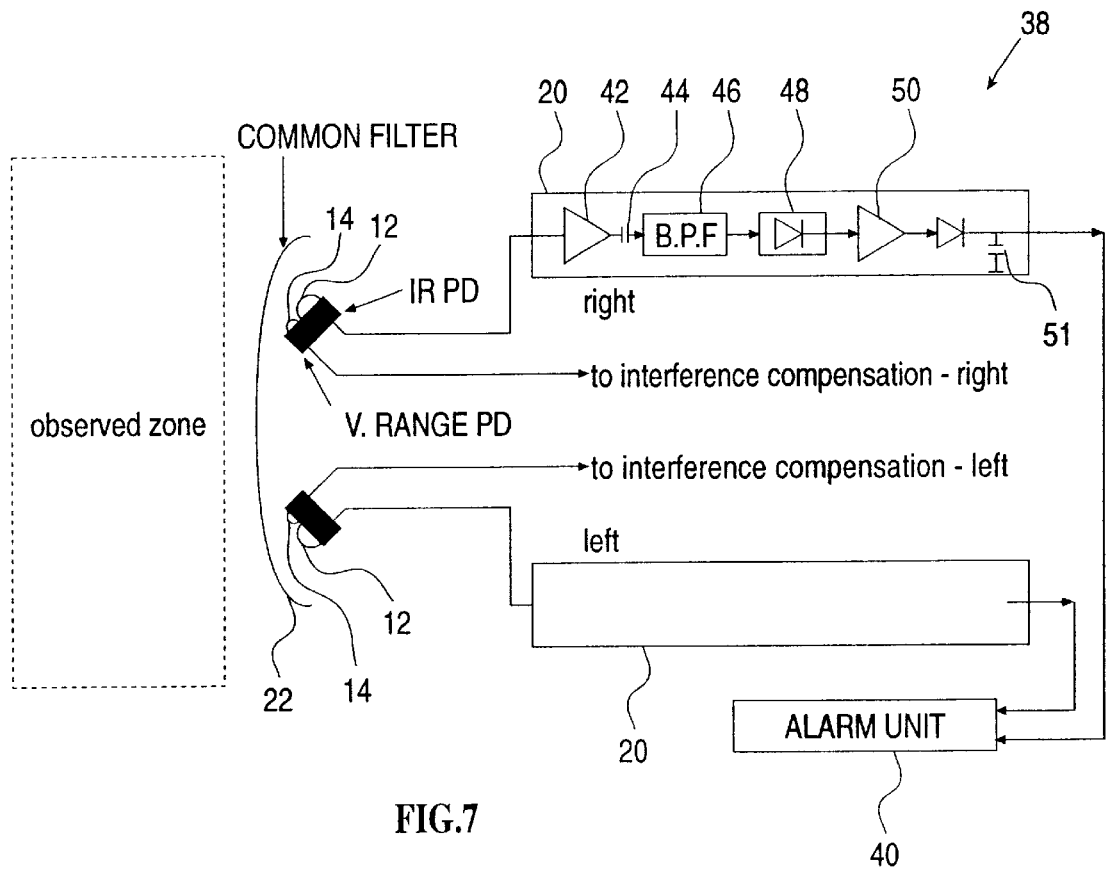
FIG. 7 is a schematic representation of a preferred implementation of a reception sub-system from the system of FIG. 4.

Turning now to FIG. 7, this illustrates a particularly simple and effective direct electronic implementation of the reception sub-system 38 of system 10 which includes sensors 12 and 14, filter 22, processing module 20 and an alarm unit 40. Secondary sensor 14 is connected to provide its output to compensation module 18, as described. The output of primary sensor 12, on the other hand, is passed to processing module 20 where signal processing is performed to generate an alarm output indicative of the presence of an obstacle within the zone of interest.

Specifically in this implementation, processing module includes an amplifier 42 followed by a capacitor 44 for blocking any DC signal received. The signal then passes through a band pass filter 46 tuned to select only frequencies close to the base frequency of signal generator 24. Then, after rectification at rectifier 48, the signal is passed to a Schmitt trigger 50 which serves to produce an even, noise-free binary output. This output is then supplied through a diode to a grounded capacitor 51 chosen to provide a decay time approximating to the period between pulses of the basic pulsed power supply, thereby "holding" the detected peaks to generate a continuous signal. The resulting output is an on-off DC voltage which is sufficiently stable to be fed directly to alarm unit 40.

Alarm unit 40 itself preferably includes an element for generating an audible alarm which may be of any conventional type. Additionally, or alternatively, a visual or tactile warning notification system may be employed. Furthermore, the alarm unit may provide distinguishable warning signals according to which of a number of sensors generated the source signal. Since different sensors correspond to different regions, system 10 can thus provide an indication of within which region or on which side the obstacle lies.

Figure 8:
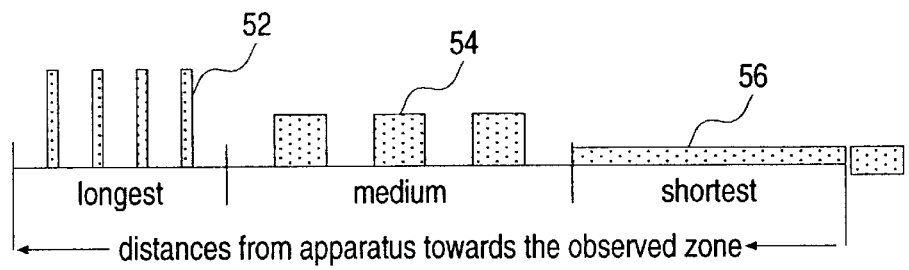
FIG. 8 is a schematic representation of an alarm signal generated by the reception sub-system of FIG. 7 in three different situations.

Referring now additionally to FIG. 8, it is a particular feature of certain preferred embodiments of the present invention that the nature and timing of a warning signal generated by system 10 is directly determined by the form of the transmitted signal. Thus, in the example described here with reference to FIGS. 5–7, the proportion of each one second cycle during which alarm 40 is activated will vary as a direct result of the signal form shown in FIG. 6. When an obstacle is at the boundary of the largest zone of interest, only the highest level signal transmitted during the first 10% of each cycle will produce sufficient reflected intensity to generate an alarm signal. This will result in a series of 0.1 second "blips" 52 at one second intervals. Then, when the obstacle enters the medium size zone of interest, reflection of the medium intensity transmitted signal from 10% to 50% of the cycle will also be sufficiently strong to be detected and to generate an alarm signal. This will result in a more insistent series of ½ second "beeps" 54. Finally, when the obstacle enters the shortest range zone of interest such that even the lowest level transmitted signal produces a detectable reflection, the warning will switch to a continuous tone 56.

It should be noted that, besides the elegant simplicity of such a system, the form of warning notification described is highly advantageous. The differences between these three different types of notification is immediately and unambiguously identifiable to the human ear, thereby avoiding the problems of misinterpretation which are common in known warning systems.

Parenthetically, it should be noted at this point that the implementations of various components described thus far, as well as variations thereof which will be mentioned below, are provided merely by way of illustration and are by no means exclusive. To illustrate this point, it should be noted that an alternative implementation can readily be achieved by use of a microcomputer together with appropriate software operating under a suitable operating system to replace one or more of signal generator 24, compensation module 18, modulator module 26 and processing module 20. Each module is typically implemented as a separate software module stored within some non-volatile memory device for execution by a CPU. Interfacing with the sensors, transmitters and alarm unit is achieved using conventional analog and/or digital interfaces or samplers as is known in the art.

Turning now to the second set of features relating to deployment of the transmitter and sensor elements, these will be described with reference to FIGS. 9–11. Specifically, system 10 is preferably configured to warn of the proximity of an obstacle within a zone delineated at least in part by a virtual straight line adjacent to a vehicle. In other words, for any given obstacle, a warning should be generated when the obstacle crosses over the virtual line into the zone of interest substantially independent of the position along the line at which it crosses.

This feature is especially important for parking or reversing applications where a warning is required of any obstacle in the path of the vehicle independent of the lateral position of the obstacle relative to the vehicle. In such an example, the zone preferably approximates to a rectangle behind the vehicle. The virtual straight line referred to is then the transverse line along the side of the zone furthest from the vehicle.

An even response along a straight line boundary is particularly difficult to achieve in a preferred embodiment in which the sensors are localized, typically near the middle of the width of the vehicle. In this case, the distance from the boundary to the sensors varies in a pronounced manner along the line.

Stated in general terms, this condition is satisfied by employing a combination of at least two transmitter elements 16 transmitting an electromagnetic signal towards the virtual straight line, and at least one primary sensor 12 responsive to a received reflected electromagnetic signal from the virtual straight line to generate a reception signal. The configuration and deployment of transmitter elements 16 and sensor 12 are chosen such that, for a given level of actuating power supply, the reception signal resulting from reflection of the transmitted electromagnetic signal from the surface of an object remains substantially constant as the object is moved along a path corresponding to a part of the virtual line.

In more specific terms, this may be achieved by two types of arrangements which may be used separately or in combination. In the first type, which will be described with reference to FIG. 9, the transmission and sensitivity profiles of transmitter and sensor elements are combined separately to generate profiles approximating to the required zone shape. In the second, described with reference to FIG. 10, the deployment of the transmitters and sensor are coordinated so that a maximum sensitivity direction of the sensor compensates for the minimum in the transmitted intensity pattern.

Figure 9:
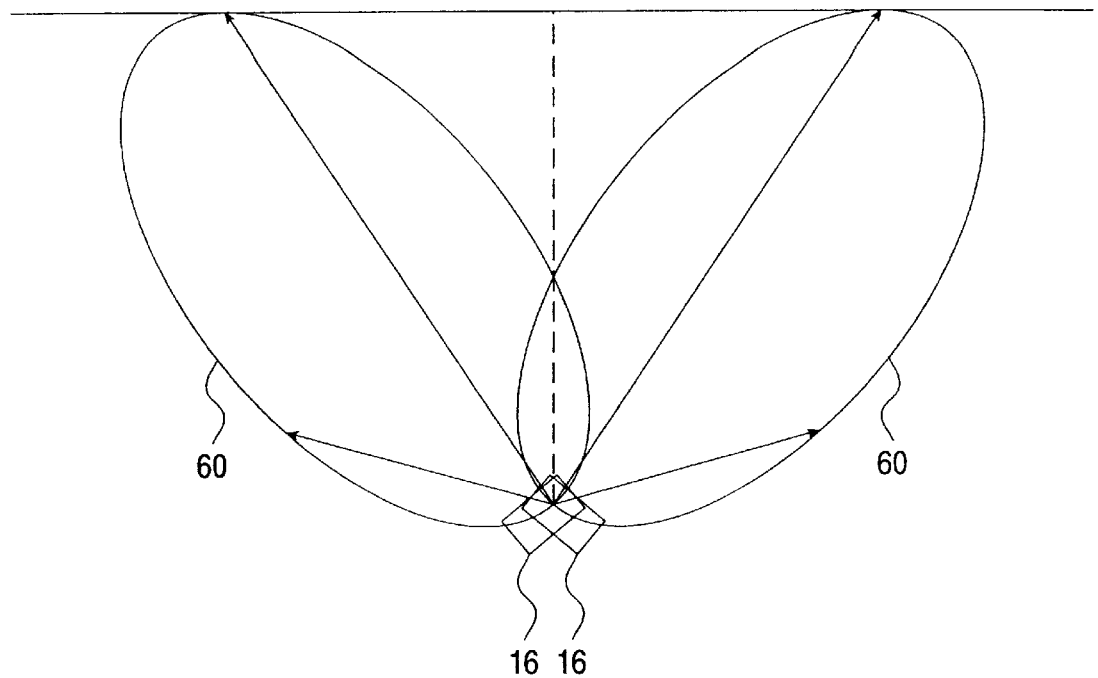
FIG. 9 is a plan view illustrating the superposition of the angular variation of transmitted intensity or reception sensitivity for a pair of transmitters or sensors.

Thus, FIG. 9 shows a pair of transmitters 16 each with a transmission intensity profile 60. Typically, a simple lensed LED exhibits a transmission intensity which decreases as a function of angle from an axial maximum intensity direction. By deploying transmitters 16 with their maximum intensity directions angularly spaced, the degree of overlap between their intensity profiles can be chosen to generate a desired total transmitted intensity at an intermediate position.

By way of example, if the transmission intensity profile of each transmitter decreases to 50% at a given angle, transmitter elements 16 can be deployed with their maximum intensity directions angularly spaced such their 50% intensity directions are substantially aligned. This generates an approximately uniform total transmission intensity profile between the axial directions of the transmitters. Clearly, if the distance from the transmitters to the required zone boundary decreases between the axial directions, as in the example illustrated, the transmitters can be deployed at a wider angle with, for example, their 40% intensity directions overlapping to generate an 80% intensity at the intermediate position. Conversely, a higher degree of overlap can be used to generate a transmission profile approximating to a longer range boundary of the zone falling between the axial directions.

As already mentioned, this approach can be used both with the transmitter elements and with multiple sensor elements to approximate to a required transmission or sensitivity profile. Sensitivity profiles of typical sensors for use in the present invention are generally similar to those of the transmitters, although the angular spread of a sensor profile is typically larger.

Figure 10:
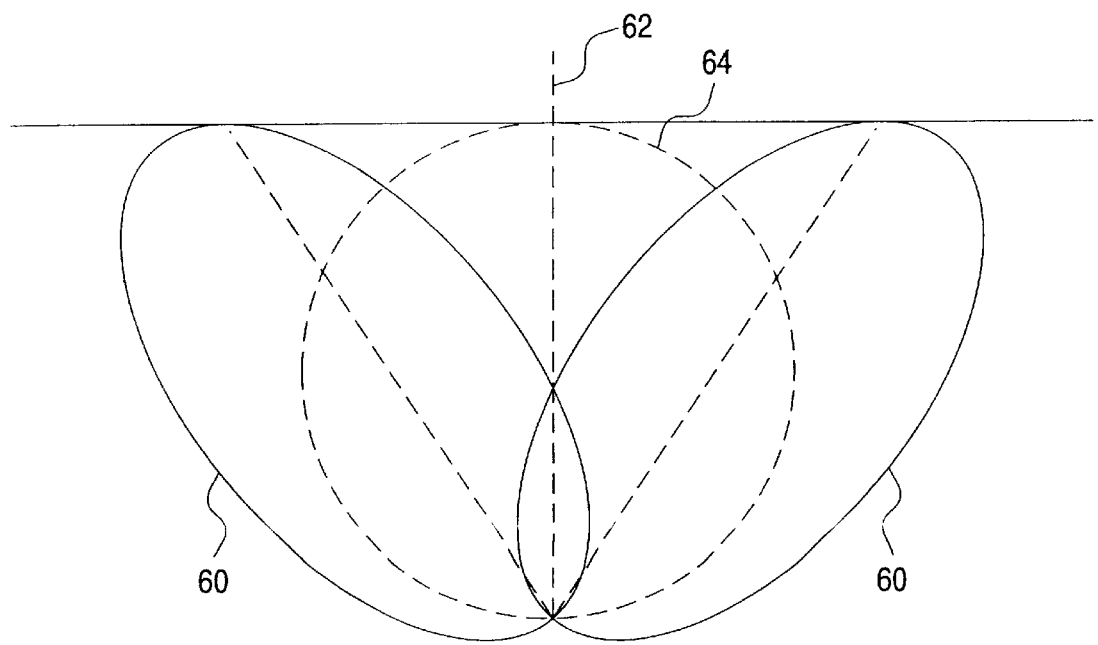
FIG. 10 is a plan view illustrating the superposition of the angular variation of transmitted intensity for a pair of transmitters and reception sensitivity for an interposed sensor.

FIG. 10 shows a pair of transmitters 16 each with a transmission intensity profile 60 which decreases as a function of angle from an axial maximum intensity direction. Transmitters 16 are deployed with their maximum intensity directions angularly spaced such that a total transmitted intensity assumes a minimum value, typically no more than about 50% of each transmitter's maximum intensity, at an intermediate angular position 62. A sensor 12, with a reception sensitivity profile 64, is aligned with its maximum sensitivity direction aligned substantially with the intermediate angular position 62. This formation ensures that the maximum sensitivity of the sensor is aligned to receive signals reflected from the lowest intensity transmission, whereas the less sensitive sensor directions receive a much stronger reflected signal. The net effect approximates to constant overall sensitivity of the system along the required straight line boundary.

Figure 11:
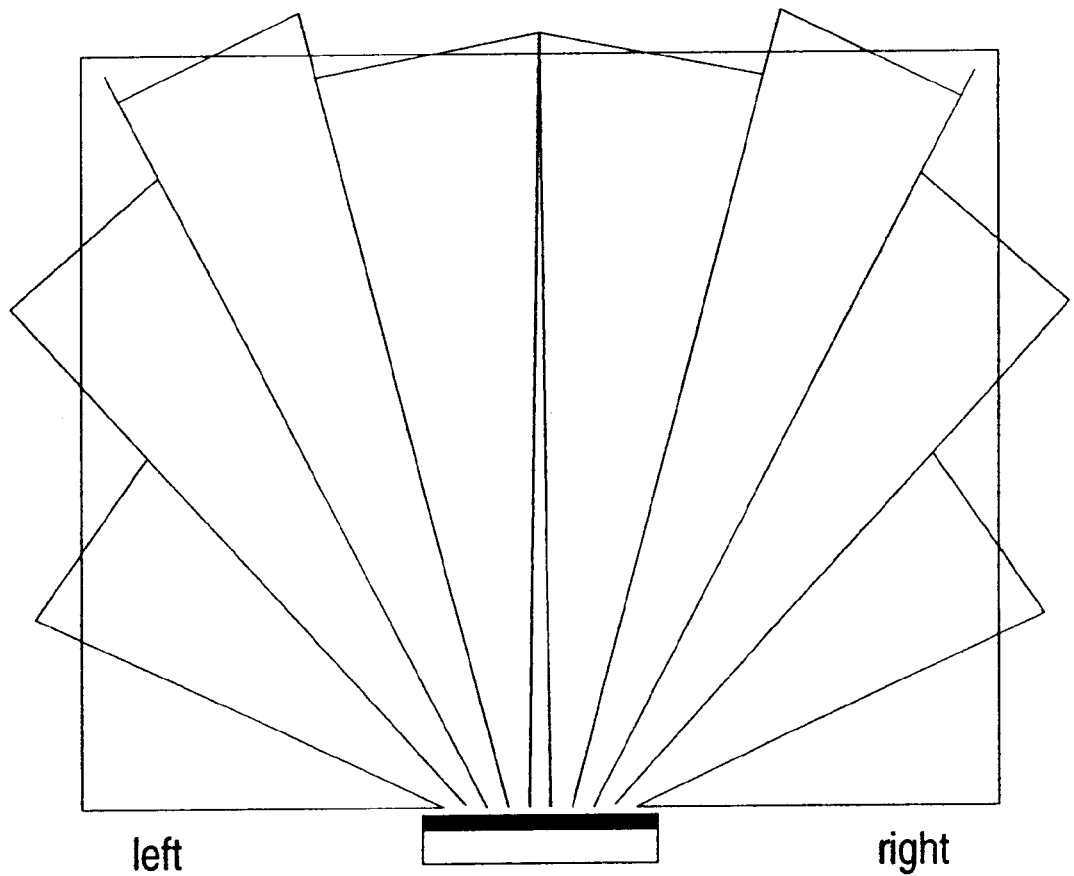
FIG. 11 is a schematic plan view of a pattern of transmitters deployed to provide comprehensive coverage of an approximately rectangular zone.

Finally with respect to this embodiment, FIG. 11 shows a pattern of transmitters 16 deployed to approximate to a rectangular zone of interest. Besides the considerations already mentioned, it will be noted that the range to be covered by different beams varies considerably both along the far boundary and, in a more pronounced manner, towards the peripheral boundaries. Tailoring of the corresponding beam intensities is achieved by provision of transmission power modifiers associated with each of the transmitter elements, for modifying the effect of the actuating power supply upon the corresponding transmitter element. In the implementation described above, transmission power modifiers correspond to modifying resistors M1, Mx of FIG. 5.

Figure 12:
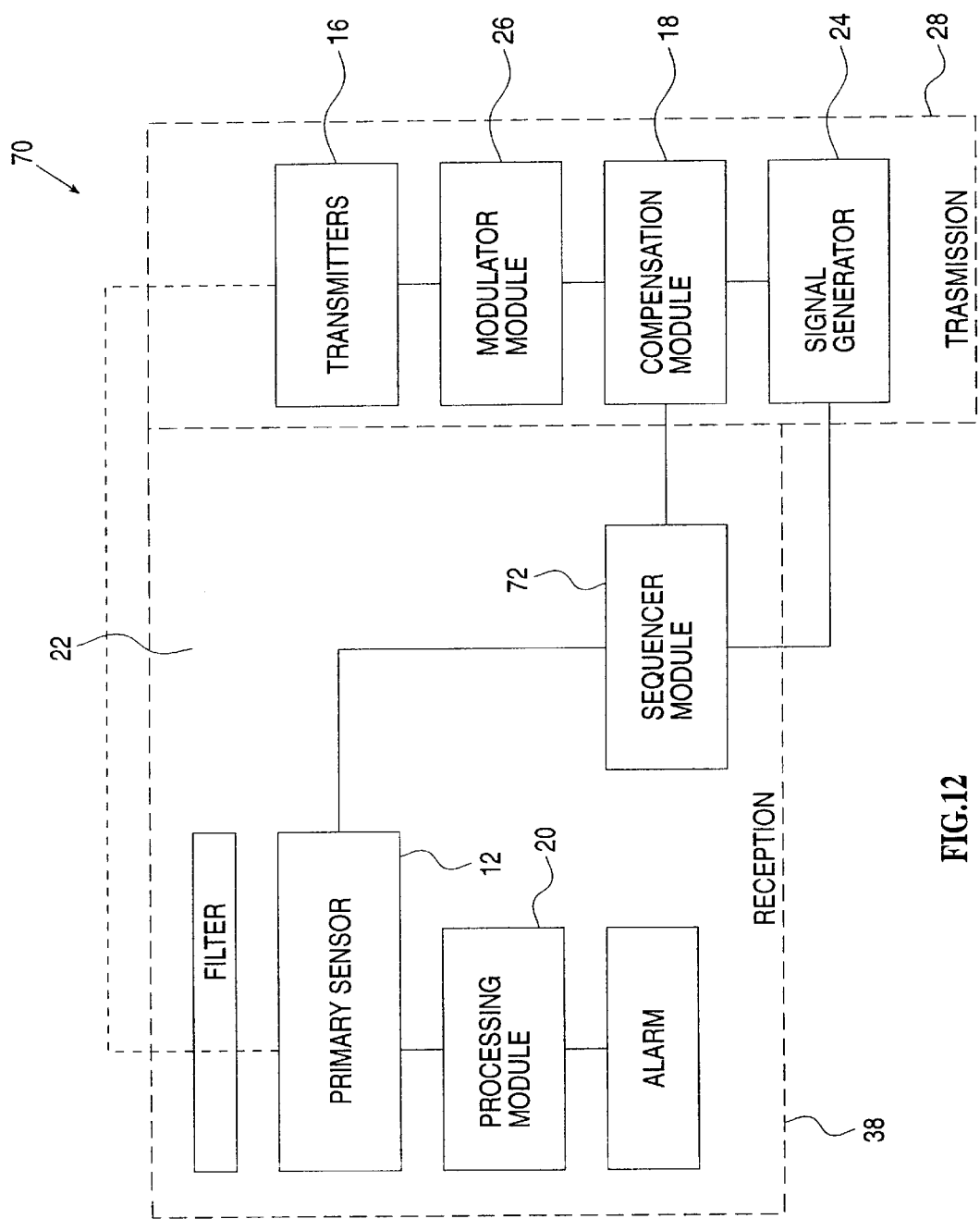
FIG. 12 is a block diagram of an alternative embodiment of a proximity warning system, constructed and operative according to the teachings of the present invention.

Tuning now to FIG. 12, this shows a second embodiment of a proximity warning system, generally designated 70, constructed and operative according to the teachings of the present invention, for warning of the proximity of an obstacle within at least one zone of interest adjacent to a vehicle. System 70 is generally similar to system 10, equivalent features being labeled similarly. System 70 is distinguished from system 10 in that the secondary sensor is omitted. Instead, the means for determining the level of background radiation is implemented as a sequencer module 72 which derives the required measurements directly from the output of primary sensor 12.

As described above, the power supply from signal generator 24 preferably has a duty cycle of less than about 5%. As a result, there is a large proportion of dead time during which no transmission occurs. Thus, the output of primary sensor 12 during the dead time intervals is a direct indication of the background intensity level being received by the sensor.

Sequencer module 72 is connected to signal generator 24 so as to be switched synchronously with the pulses of the underlying pulsed power supply. Typically, each pulse initiates a delay circuit in sequencer module 72 which briefly blocks input of a new sensor measurement. Then, once the power supply pulse has finished, sequencer module 72 inputs the current sensor measurement as an indication of the current background radiation level.

In all other respects, the structure and operation of system 70 may be understood by analogy to that of system 10 described above.

It will be appreciated that the above descriptions are intended only to serve as examples, and that many other embodiments are possible within the spirit and the scope of the present invention.

What is claimed is:

1. A proximity warning system for warning of the proximity of an obstacle within at least one zone of interest adjacent to a vehicle, the system comprising:

(a) at least one primary sensor deployed to receive radiation from at least part of the zone of interest, said primary sensor being configured to produce a primary output indicative of a quantity of electromagnetic radiation incident on said primary sensor;

(b) means for generating a compensation output indicative of a quantity of background electromagnetic radiation incident on said primary sensor;

(c) at least one transmitter configured to transmit an electromagnetic signal towards at least part of the zone of interest;

(d) a compensation module associated with said means for generating a compensation output and said transmitter, said compensation module being responsive to said compensation output to vary a transmission power of said electromagnetic signal; and (e) a processing module associated with at least said primary sensor, said processing module being responsive to said primary output to generate a warning signal.

2. The system of claim 1, wherein said transmitted electromagnetic signal lies within the infrared portion of the electromagnetic spectrum.

3. The system of claim 1, wherein said at least one primary sensor is sensitive to a first range of wavelengths, and wherein said means for generating a compensation output includes at least one secondary sensor configured to produce a compensation output indicative of a quantity of electromagnetic radiation within a second range of wavelengths incident on said secondary sensor, said transmitter being configured to transmit an electromagnetic signal at a wavelength falling within said first range but outside said second range.

4. The system of claim 3, wherein said second range lies substantially within the visible portion of the electromagnetic spectrum.

5. The system of claim 4, further comprising a radiation filter deployed in front of both said at least one primary sensor and said at least one secondary sensor, said radiation filter being configured to substantially block a major part of both the infrared portion and the visible portion of the electromagnetic spectrum.

6. The system of claim 3, wherein each of said at least one secondary sensor is deployed adjacent to a corresponding one of said at least one primary sensor.

7. The system of claim 1, further comprising a signal generator associated with said at least one transmitter and said compensation module, said signal generator being configured to generate an underlying pulsed power supply having a duty cycle of less than about 5%.

8. The system of claim 1, further comprising a modulator module associated with said at least one transmitter and said compensation module, said modulator module being configured to modulate said transmission power of said electromagnetic signal cyclically between at least two relative power levels corresponding to at least two different-sized zones of interest, a highest one of said at least two relative power levels being generated for less than about 20% of each cycle.

9. A proximity warning system for warning of the proximity of an obstacle within a zone of interest adjacent to a vehicle, the zone being delineated at least in part by a virtual straight line, the system comprising:

(a) a plurality of transmitter elements responsive to an actuating power supply to transmit an electromagnetic signal towards the virtual straight line; and (b) at least one sensor responsive to a received reflected electromagnetic signal from an obstacle located at said virtual straight line to generate a reception signal, wherein the configuration and the deployment of said transmitter elements and of said at least one sensor are such that, for a given level of actuating power supply, said reception signal resulting from reflection of said transmitted electromagnetic signal from the surface of an object remains substantially constant as the object is moved along a path corresponding to a part of the virtual line.

10. The system of claim 9, wherein each of said transmitter elements has a transmission intensity which decreases as a function of angle from a maximum intensity direction, two of said transmitter elements being deployed with their maximum intensity directions angularly spaced such that a total transmitted intensity assumes a minimum value at an intermediate angular position, and wherein said sensor has a reception sensitivity which decreases as a function of angle from a maximum sensitivity direction, said sensor being aligned with its maximum sensitivity direction aligned substantially with said intermediate angular position of minimum total transmitted intensity.

11. The system of claim 9, wherein each of said transmitter elements has a transmission intensity which decreases as a function of angle from a maximum intensity direction to a 50% intensity direction, two of said transmitter elements being deployed with their maximum intensity directions angularly spaced such their 50% intensity directions are substantially aligned.

12. The system of claim 9, further comprising a transmission power modifier associated with each of said transmitter elements, each of said transmission power modifiers modifying the effect of said actuating power supply upon the corresponding one of said transmitter elements such that a combined intensity of said electromagnetic signal from all of said transmitter elements reaching said part of the virtual line is substantially constant along the line.

\* \* \* \* \*